Patented June 10, 1930

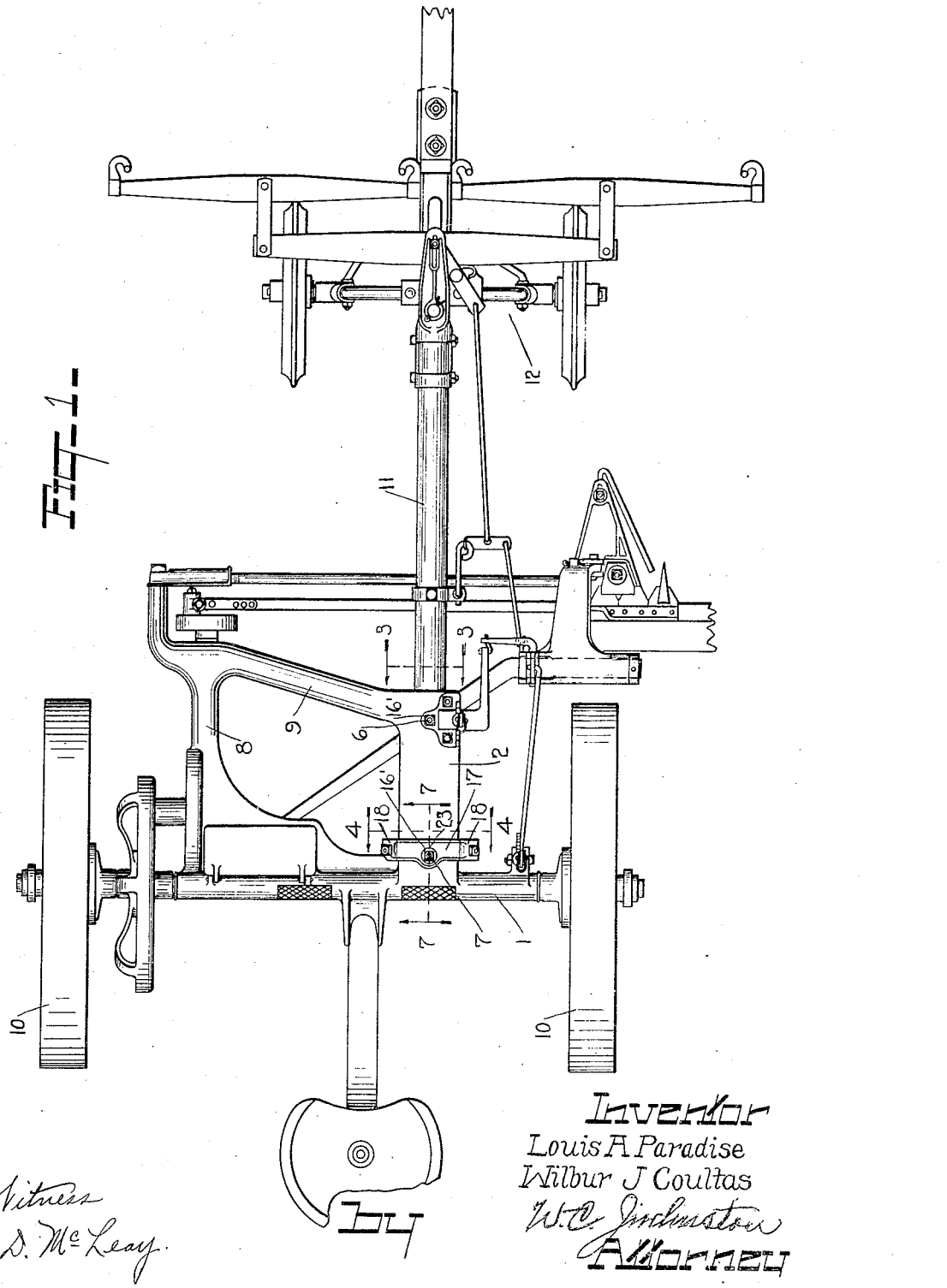

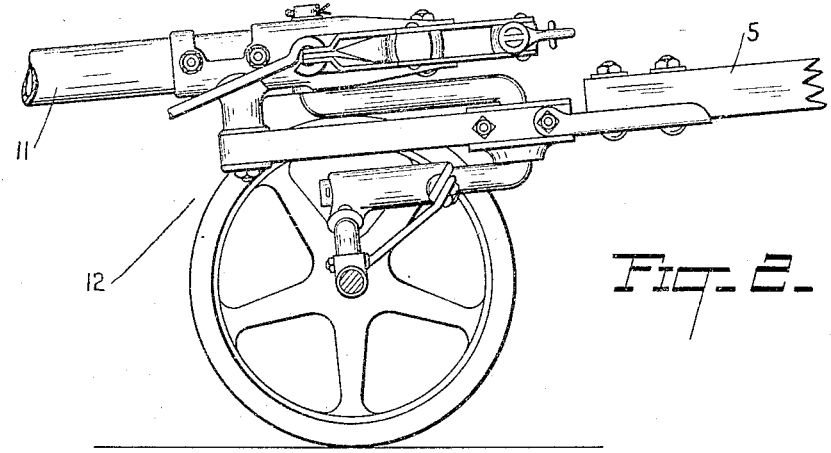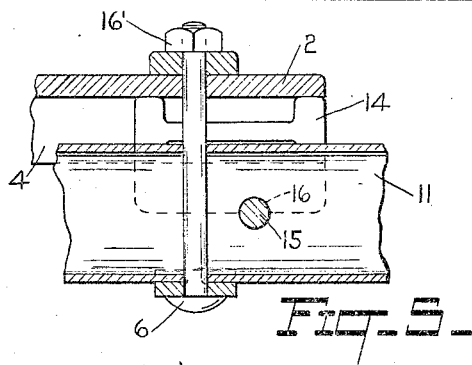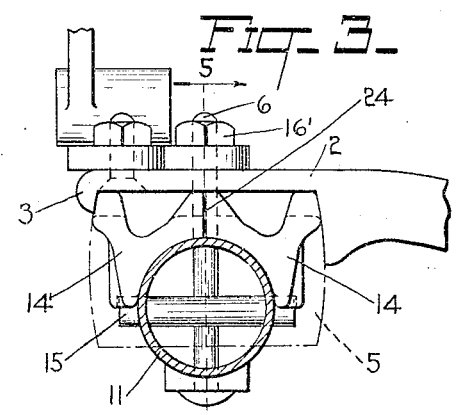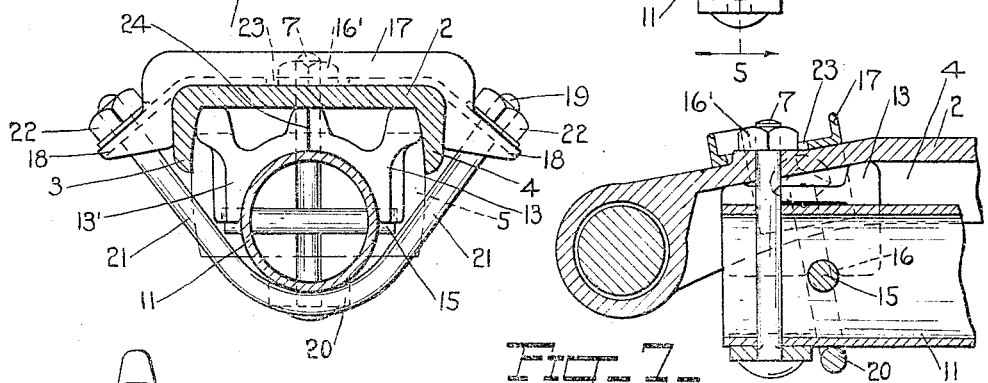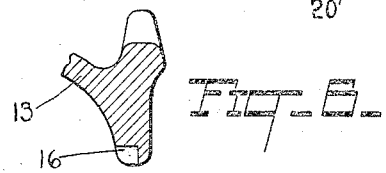

1,762,584

UNITED STATES PATENT OFFICE

LOUIS A. PARADISE AND WILBUR J. COULTAS, OF MOLINE, ILLINOIS, ASSIGNORS TO DEERE & COMPANY, OF MOLINE, ILLINOIS, A CORPORATION OF ILLINOIS

TONGUE SUPPORT FOR MOWERS

Application filed January 26, 1929. Serial No. 335,175.

Our invention relates to the draft mechanism of mowing machines and more particularly where it is desirable to substitute for the wooden pole commonly employed a truck supported tubular stub tongue, and the object of our invention is to provide means for mounting such a tongue without making any change in the mower frame to accommodate it.

Referring to the drawings in which similar numerals indicate identical parts—

Figure 1 is a plan view of a mower illustrating the application of our stub tongue.

Figure 2 is a side elevation showing the tongue supported on a truck.

Figure 3 is an enlarged detail section on the line 3—3 of Figure 1 showing the manner of securing the stub tongue to the front of the mower frame.

Figure 4 is an enlarged detail section on the line 4—4 of Figure 1 showing the manner of securing the stub tongue to the rear of the mower frame.

Figure 5 is a section on the line 5—5 of Figure 3.

Figure 6 is a fragmentary view, in part section, of one of the parts of our device, and Figure 7 is an enlarged detail section on the line 7—7 of Figure 1.

In the operation of harvesting, with a horse drawn mower particularly, the facility by which the work is performed is affected by the condition of the ground surface and the weight of the crop, for if the ground is rough or soft, or if the crop is heavy and the draft pole is supported on the necks of the horses, it is evident that the strain upon the necks of the horses by the down pressure of the pole will be considerable; to reduce this strain as much as possible a stub tongue has been utilized which is mounted on the frame with its forward end supported on a truck to which the draft pole is pivotally connected. Heretofore it has been impossible to substitute a stub tongue for a pole, or a pole for a stub tongue, without making a change in the mower frame, for the frames are made for either a pole or for a tubular stub tongue, one frame on which a pole only can be be mounted and another to which a tubular stub tongue only can be attached. Now to avoid the necessity of having two frames to accommodate a change in the draft device, we have provided a means whereby one frame only is utilized to support either a pole or a stub tongue.

The frame, of the mower, is of a well known type and includes a tubular bearing 1, in which the axle is journaled; integral with the body of the frame and extending forwardly therefrom is the pole or tongue support 2 having downwardly extending flanges 3 and 4 between which the pole 5, shown in dotted lines in Figures 3 and 4, is firmly held by bolts 6 and 7 extending through the support 2 and held firmly by suitable nuts. The remainder of the frame includes a part 8 connected with the pole support by a transverse part 9. Wheels 10 are mounted on the axle.

It is to be presumed that it is desirable to substitute a stub tongue 11 for the pole; accordingly, we remove the bolts 6 and 7 after which the pole 5 can be readily displaced, and the front of the frame propped up to receive the tubular stub tongue 11 shown mounted on a truck 12 of a preferable type. To accommodate the tubular stub tongue 11 to the support 2 of the mower frame without changing the frame in any way, and after the stub tongue has been placed under the support 2, we employ cast blocks 13 and 13' and 14 and 14' of similar form, the blocks 13 and 13' being positioned forward on the stub tongue 11, and the blocks 14 and 14' positioned on the rear termination of the stub tongue. Each of the said blocks extends downwardly on opposite sides respectively of the tongue fitting snugly thereon and forming saddles in which the stub tongue rests and is secured; the upper side of the blocks contacting with the underside of the support 2 and the flanges 3 and 4. To resist any rotary strain on the tubular stub tongue which might result when the machine is traveling over a rough surface, we utilize pins 15 inserted through the stub tongue transversely thereof and engaging with notches 16 in the blocks, the outer ends of the notches are closed to prevent longitudinal movement of the pins after they are placed. The blocks 13 and 13′ can be made as one, and as can the blocks 14 and 14′; we prefer the construction shown, however, with a slight space 24 between 13 and 13′, and 14 and 14′, to allow for any inequality in the fitting of the blocks with the support 2. The inner face of the flanges 3 and 4 have a downward flare and the surface of the blocks contacting therewith are beveled inwardly consequently by operation of the nuts 16′ the parts can be drawn together in rigid relation.

The stub tongue 11 is now ready to be secured to the support 2 by the bolts 6 and 7; we move either the frame or the stub tongue until they are properly placed relative to each other, so that the bolt holes in the support 2 and similar holes, formed by opposed grooves (not shown) in the blocks 13 and 13′ and 14 and 14′ and in the stub tongue 11 register, then by operation of nuts 16′ on the bolts the stub tongue 11, the blocks 13 and 14 and the support 2 are rigidly held together. To further strengthen the connection of the parts just mentioned we provide a member 17 placed to extend transversely of the support adjacent the rear end of the stub tongue 11; the ends of the member 17 are bent downwardly to closely clamp the support 2 therebetween, the ends terminating in outwardly extending lugs 18, the upper surfaces of the latter being downwardly and outwardly inclined.

A V-shaped bolt 19, having its central portion 20 bent concentric with the tubular stub tongue, straddles the latter, and its arms 21 extend upwardly and through suitable holes in the lugs 18 of the member 17 where they are secured by nuts 22. It is very evident this construction just cited is an important and valuable aid to the other means described and operating to secure the support 2 and the stub tongue 11 rigidly together; the member 17 is readily removable without disturbing other adjacent parts for there is an opening 23 in the member 17 which, as shown in Figure 7, when the latter is placed, allows the end of the bolt 7 and the nut 16′ thereon to project therethrough, as clearly shown in Figure 4, the bolt 7 having no function in securing the member 17 in place while it will act to prevent said member from moving longitudinally of the support should it become loose thereon.

The practical and economical advantages of our invention are clearly evident for with its use the pole support on the frame can be readily adapted to support a tubular stub tongue and to make the change requires but little time and labor.

What we claim is—

1. The combination of a mower frame including a support for a tongue, a tubular stub tongue adapted to be secured in said support, a plurality of blocks insertable between the support and stub tongue and astride the stub tongue, pins extending transversely of and through said stub tongue notches in the blocks with which said pins engage, and means to secure the stub tongue and blocks rigidly to the support.

2. The combination of a mover frame including a tongue support having downwardly extending flanges, a tubular stub tongue secured to the underside of said support, a plurality of blocks between said flanges and the stub tongue astride the latter and positioned respectively at the front and rear of the support, means to secure the stub tongue and blocks rigidly to the support, pins extending transversely of and through the stub tongue, and notches in said blocks with which the pins engage, said notches closed at one end thereof to hold said pins from longitudinal movement.

3. In a machine of the type described, the combination of a frame including a forwardly extending tongue supporting member of U-shaped cross-section, a block having bearing in the corners of this support and having a semi-cylindrical longitudinal recess, a tongue fitting in said recess, a clamping member mounted transversely of the tongue supporting member and having perforated lugs extending beyond each side of the tongue supporting member, a V-shaped bolt embracing said tongue and having its ends projecting through said perforations, and nuts on the ends of said bolt operating to hold said tongue and block to the tongue supporting member.

LOUIS A. PARADISE.
WILBUR J. COULTAS.